United States Patent [19]

Yu

[11] Patent Number: 5,058,704
[45] Date of Patent: Oct. 22, 1991

[54] TURBO JET MUFFLER

[76] Inventor: Chuen-Huan Yu, 26 Alley 7, Lane 100 Tun Hua S. Road, Taipei, Taiwan

[21] Appl. No.: 274,313

[22] Filed: Nov. 21, 1988

[51] Int. Cl.⁵ .............................................. F01N 1/14
[52] U.S. Cl. .................................. 181/262; 181/280
[58] Field of Search ............... 181/239, 255, 256, 262, 181/263, 279, 280, 269

[56] References Cited

U.S. PATENT DOCUMENTS

| | | | |
|---|---|---|---|
| 879,583 | 2/1908 | Pratt | 181/269 |
| 1,043,966 | 11/1912 | Oldberg | 181/269 |
| 1,484,526 | 2/1924 | O'Connor | 181/239 |
| 2,501,767 | 3/1950 | Fluor et al. | 181/282 |
| 3,175,640 | 3/1965 | Matsui | 181/252 |
| 4,147,230 | 4/1979 | Ormond et al. | 181/262 X |
| 4,317,502 | 3/1982 | Harris et al. | 181/280 |
| 4,487,289 | 11/1984 | Kicinski et al. | 181/263 X |
| 4,685,534 | 8/1987 | Burstein et al. | 181/243 X |
| 4,792,014 | 12/1988 | Shin-Seng | 181/280 |

FOREIGN PATENT DOCUMENTS 641878 8/1962 Italy .................................... 181/280

Primary Examiner—Brian W. Brown
Attorney, Agent, or Firm—Wagner & Middlebrook

[57] ABSTRACT

An improved muffler including a body 2 with an exhaust inlet 3 in the form of a porous pipe enclosed in s second porous pipe 31 for diffusing exhaust gases into the interior of body 2. A pair of pipes 5 introduce ambient air into the discharge region of the muffler. A constricted discharge opening 41 of the body 2 encircles the pipes 5 and confine helical vanes 51 which impart a helical path to the exhaust gases just before mixing with ambient air from the pipes 5. A venturi section 6 with a bell shaped outlet 62 completes the tailpipe section 4. An auxiliary air inlet 43 to the venturi 6 adds additional ambient air to the final outlet via ports 63. In an additional embodiment (FIG. 8), the venturi section 113 is within the muffler body 100. A constricted tube 121 provides a direct path for a portion of the exhaust gases while the major quantity of exhaust gases traverse the helical paths defined by the vanes 123.

20 Claims, 5 Drawing Sheets

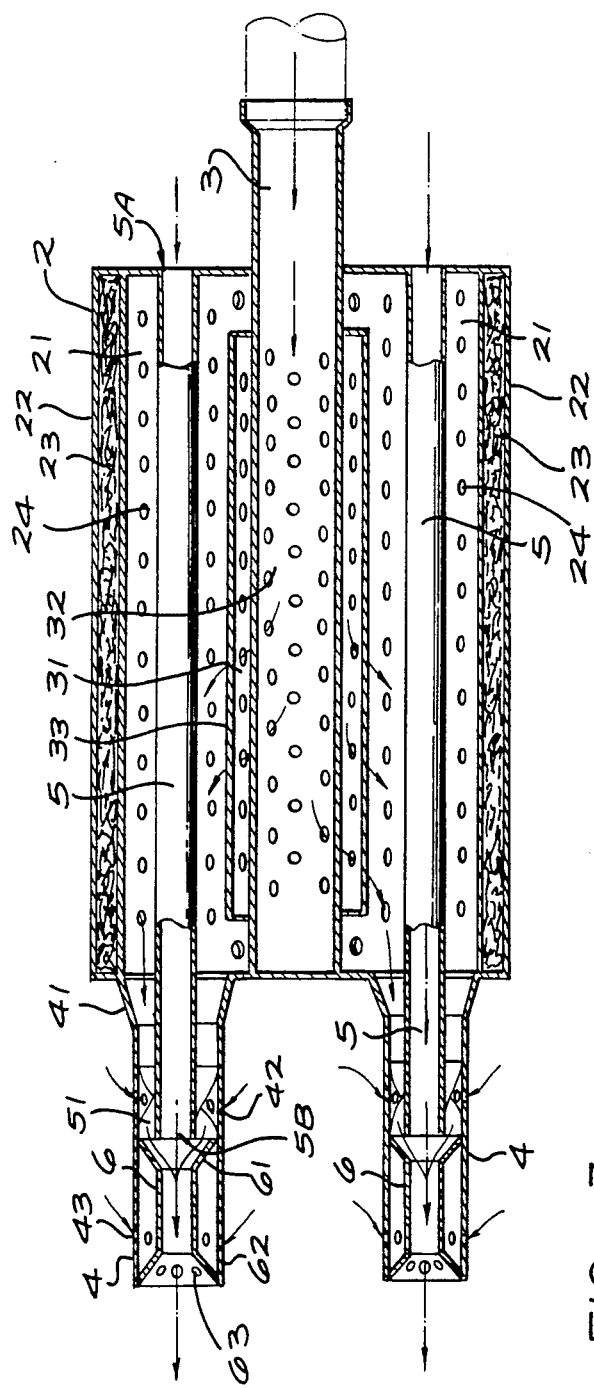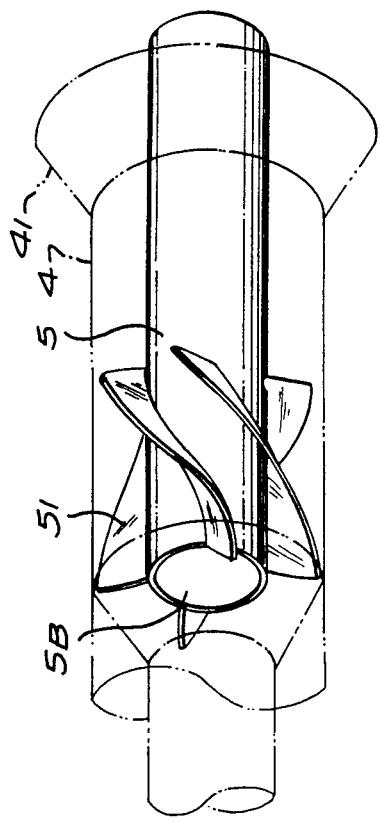
FIG. 3
FIG. 4

TURBO JET MUFFLER

BACKGROUND OF THE INVENTION

There exists a continuing need for improved mufflers for vehicles for noise reduction with a minimum of back pressure on the engine. Engine performance and fuel efficiency are directly related to the back pressure at the engine exhaust system. The lower the value of the back pressure, the greater the engine efficiency. Unfortunately, back pressure is necessarily added by the presence of a muffler. No place is an unmuffled internal combustion engine acceptable so engineers have learned to live with the efficiency reduction caused by the muffler.

Various forms of chambering of the muffler are known, one including two chambers, an initial one in which the exhaust gases are introduced via a perforated pipe for transfer via the open chamber to a second perforated pipe to a second chamber which is filled with acoustic energy absorbing material and then out through the last pipe. Significant sound reduction is obtained in such mufflers and the industry accepts the efficiency limitations imposed by such mufflers.

BRIEF DESCRIPTION OF THE INVENTION

Faced with this state of the art, I devised a new muffler composed of a muffler body with one exhaust inlet pipe, two auxiliary intake pipes and two specially designed tail pipes. Exhaust from the engine is directed into the muffler via the exhaust inlet pipe, is mixed with fresh air from the auxiliary inlet pipes and directed through fixed spiral blades inside of a pair of tail pipes and then exits through bell shaped outlet ports. Within the muffler body, the inlet exhaust gases are defused into the interior chamber of the muffler body which is lined with acoustic absorbing material such as alumina for sound absorption. A pair of outlet ports with a reducing conical or venturi shaped section is followed by fixed helical blades for spinning the exhaust gases. Fresh air from the two inlets is conducted by internal pipes to the region of the helical blades where the fresh air is mixed with the spinning exhaust gases and then the combined exhaust gases and fresh air exit the muffler through the bell shaped outlet port. Additional fresh air is mixed at the bell outlet having entered the tail pipe via side ports in its double wall.

BRIEF DESCRIPTION OF THE DRAWING

This invention may be more clearly understood from the following detailed description and by reference to the drawings, in which:

FIG. 3 is a longitudinal diametrical sectional view of the embodiment of FIG. 2;

FIG. 4 is a perspective view of the vane section of the embodiment of FIGS. 2 and 3 with portions of the invention shown in phantom;

DETAILED DESCRIPTION OF THE INVENTION

Figure 1:
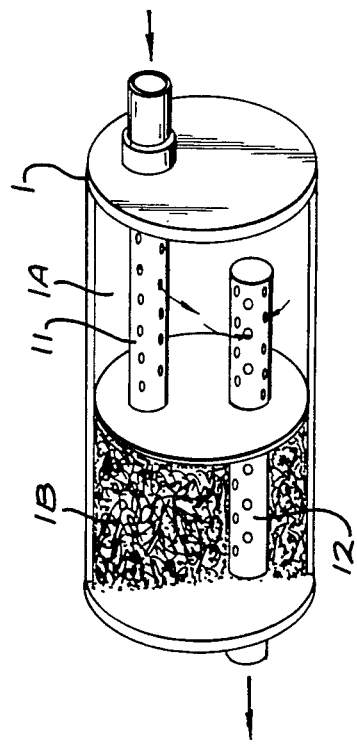
FIG. 1 is a perspective view of a typical prior art muffler with the body diametrically sectioned for clarity.

Referring now to the drawing, FIG. 1, a conventional muffler 1 may be seen therein having a cylindrical body which defines two compartments or chambers 1A and 1B. An inlet pipe 11 extends into chamber 1A and is porous as indicated by the number of holes in its side wall in the chamber 1A. It is spaced from the exterior wall of the muffler 1 and allows exhaust gases which reach the muffler 1 by flow into the muffler in the direction of the right hand arrow in FIG. 1. A second porous pipe 12 extends through compartment 1B and into compartment 1A and has numerous openings into which exhaust gases from chamber 1A flow to chamber 1B and then out the open tailpipe end of the pipe 12 in the direction of the left hand arrow. Exhaust gases from the engine to which the muffler 1 is connected fill the chambers 1A and 1B and then exhaust through the tailpipe with reduced sound level.

The conventional muffler produces unwanted back pressure on the engine exhaust manifold and reduces its efficiency.

Figure 2:
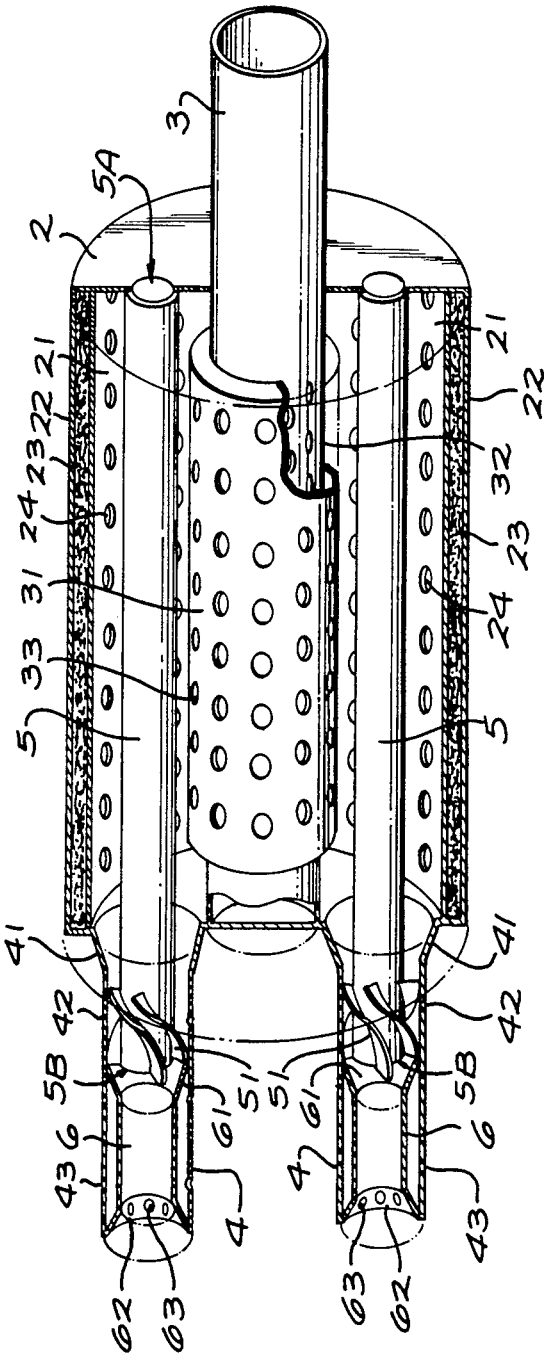
FIG. 2 is a perspective view of an embodiment of my invention partially diametrically sectioned to illustrate this invention.
Figure 6:
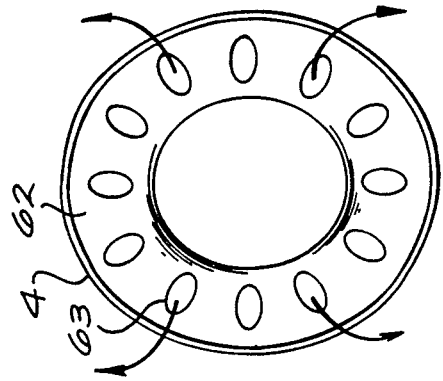
FIG. 6 is a rear elevational view of one of the tail pipe outlets of this invention.
Figure 5:
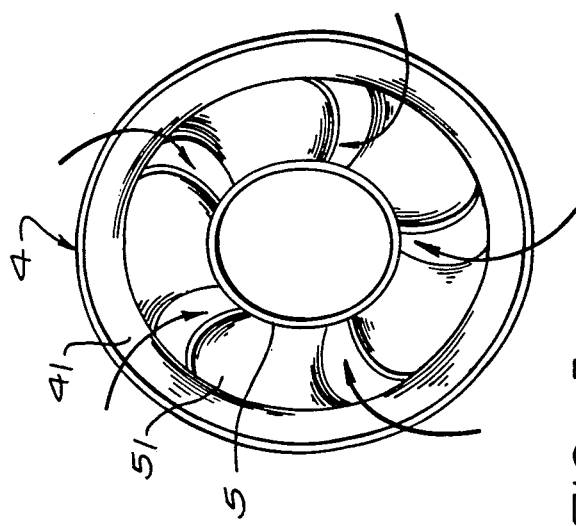
FIG. 5 is a transverse sectional view of the tailpipe section of this invention taken along line 5—5 of FIG. 3.

FIG. 2 illustrates this new design. It includes a cylindrical body 2, generally similar in size to the prior art mufflers illustrated in FIG. 1. The body 2 defines a single interior chamber into which exhaust gases from the muffler's associated engine (not shown) through inlet pipe 3. Pipe 3 is porous within the chamber defined by the body 2 and is encircled by a porous tube 31 to provide a double layered multiporous tube connected to the engine exhaust.

The longitudinal wall 22 of the muffler body 2 encloses an inner wall 21 with alumina fibers between the walls 21 and 22. The inner wall 21 has a number of ports 24 exposing the alumina fibers to the exhaust gases. The combination of the dual layered multiporous tubes for the main exhaust pipe and the alumina fibre inside the muffler recreates the best muffling effect.

The rear end of the body includes a pair of convergent tubes 41 which join a pair of tail pipes 4. Extending from the inlet end of the muffler 2 are a pair of auxiliary pipes 5, each having an auxiliary ambient air inlet 5A and extending through the chamber of body 2 and into the converging tubes 41 and for approximately half of the length of tailpipe 4. Surrounding the auxiliary pipes between the convergent section 41 and the end of the tubes 5 are a series of fixed spiral vanes 51 for accelerating the flow of exhaust gases as they leave the chamber of body 2. The spiral vanes 51 end at the outlet ends 5B of the auxiliary pipes 5 where the exhaust gases are mixed with the ambient air introduced in inlets 5A, further confined in convergent tube section 61 and then introduced into the actual tailpipe 6 with its bell shaped mouth 62.

The tail pipe 6 has three sets of openings additionally, a beginning group 42, a middle group 43 in the outer wall of the tailpipe 4 and end group 63 in the bell housing 62. The openings 42 allows additional ambient air to enter the exhaust gases as they are swirled by the vanes. The ports 43 allow additional ambient air to enter the double walled section between the tailpipe 6 and its inner constricted tube 6. Air entering between the walls of the tailpipe 6 and its inner tube 6 exits through the ports 63 in the bell outlet 62. Since the muffler is intended primarily for use on motor vehicles with the inlet pipe toward the front, the inlets 5A can expect to have a positive flow of air through pipes 5 from their inlets 5A to their outlets 5B during motion of the vehicle and thereby aiding in the mixing of the exhaust gas with this ambient air.

For an understanding of the operation of this invention, reference is now made to FIG. 3. When exhaust gases from the engine reach the muffler, they first diffuse from the inlet pipe 3 to the area between the porous pipe 3 and its outer tube 31 and then diffuses into the muffler body. Most of the noise is eliminated by this double diffusion process. Additional noise is eliminated by the alumina fiber lining the muffler wall.

Figure 7:
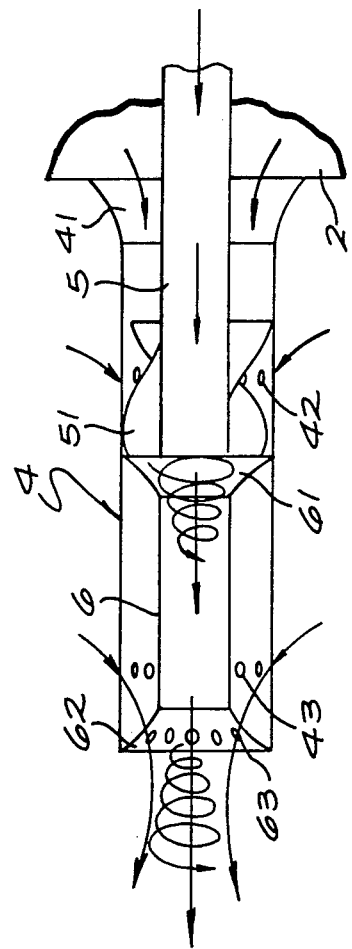
FIG. 7 is a simplified longitudinal fractional sectional view of the tail pipe section of this invention.

After the double diffusion process in the main chamber of the muffler body 2, the exiting of the exhaust gases is best understood by reference to FIGS. 3, 5, 6 and 7 with particular reference to FIG. 7. The diffused exhaust gases in the main chamber of body 2 exit the body 2 through convergent funnel-like section 41 in which the gases are accelerated generally in straight flow until they reach the spiral or more precisely helical vanes 51 which swirl the exhaust gasses until they reach the second or venturi formed by nozzle pipe 6 where the swirling exhaust gases mix with the straight flowing outside air and pass to the bell shaped outlet 62 where the combined exhaust gases and outside air enter the atmosphere. Added to the foregoing flow is additional ambient air which has entered ports 43 in the tailpipe 4 and exits through the ports 63 in the bell shaped outlet 62.

Figure 8:
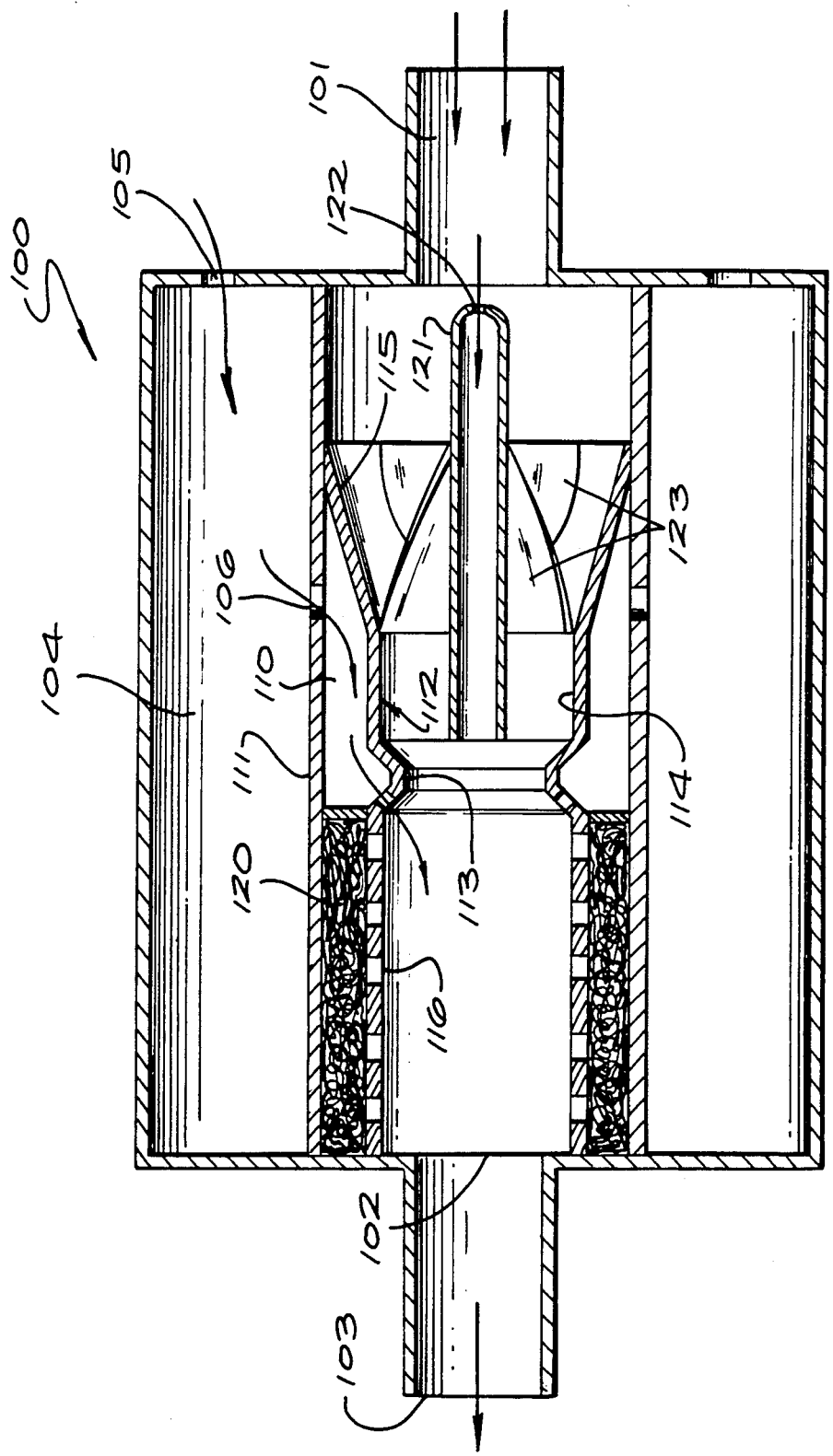
FIG. 8 is a longitudinal sectional view of an alternate embodiment of this invention.

This invention may also be incorporated in a modified embodiment as shown in FIG. 8. This embodiment includes a muffler body 100 with an exhaust inlet 101 for coupling to the engine and an outlet 102 conected to a tailpipe 103. The muffler body 100 defines an outer annular chamber 104 with an ambient air inlet 105 and a transfer outlet 106 to an intermediate annular chamber 110. The intermediate chamber 110 is defined by a tubular wall 111 which includes inlet 106 and a formed tubular wall 112 which defines a venturi section 113, a uniform diameter section 114 and a constriction region 115 toward the exhaust inlet 101 end and a tubular porous section 116 which encloses an alumina packed chamber 120.

The formed tubular wall 112 encloses an axial tube 121 with a constricted opening 122 for receiving exhaust gas from inlet 101 and passing it directly toward the outlet 102. In the space between the outer wall of tube 121 and the converging section 115 and the tubular section 114 of the formed tubular wall 112 is a series of helical vanes 123. These vanes 123, similar to the embodiment of FIGS. 1-7 serve to impart helical flow to the exhaust gases while constricting the path in first the section 115 prior to entry of the exhaust gases into the venturi section 113 of the formed tubular wall 112.

In this embodiment, ambient air is introduced into chamber 104 rather than through pipes as in FIG. 1. Also, in this embodiment, all of the exhaust gases are not conveyed through a helical path but some of the gases pass directly through tube 121. The proportion of the gases passing directly toward the outlet 102 is determined by the size of the constricted opening 122. In the embodiment of FIG. 8, exhaust gases, both swirled and direct are mixed with outside air following the venturi section 113 and there is no bell outlet as in FIG. 1.

Figure 9:
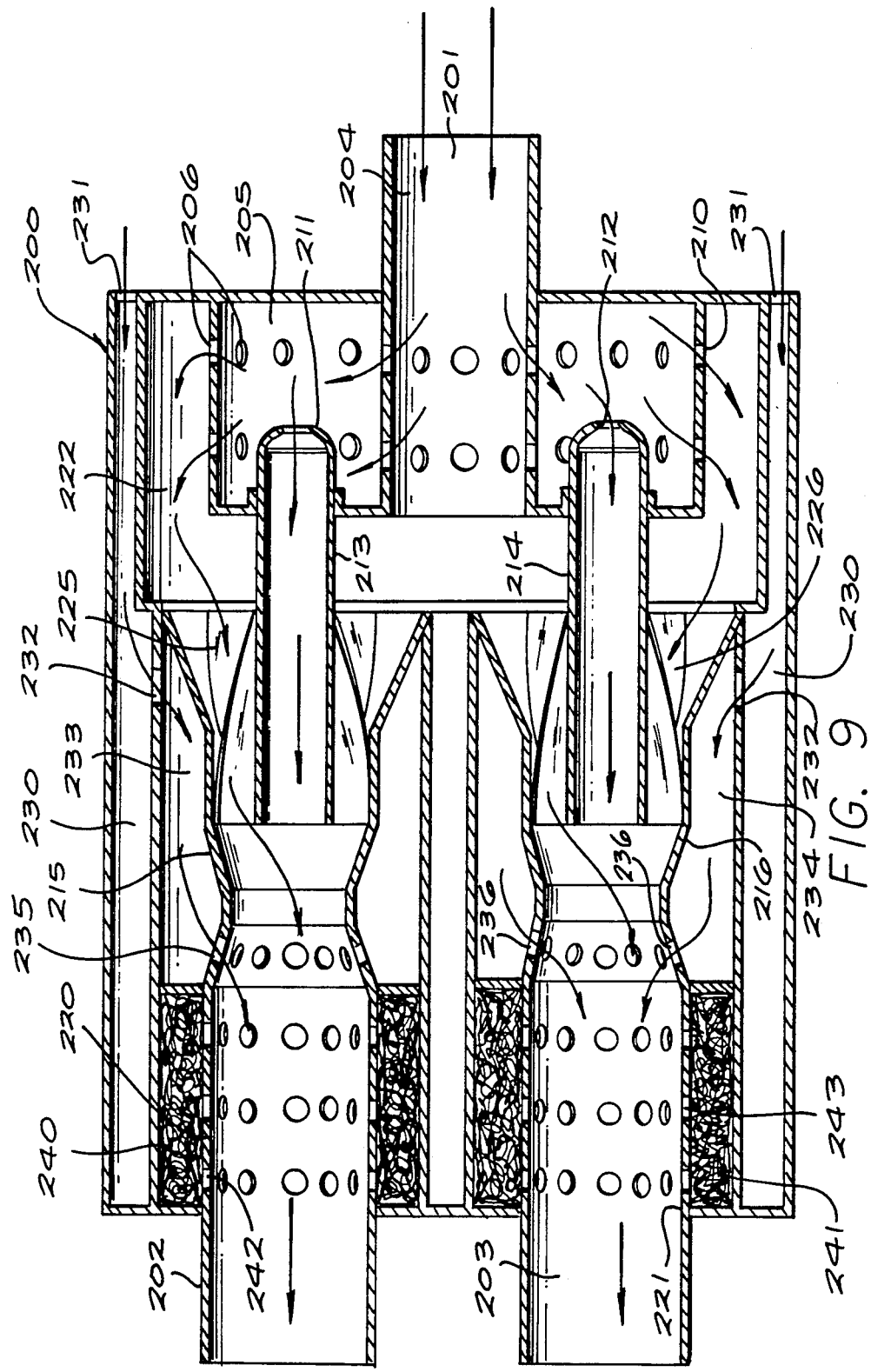
FIG. 9 is a longitudinal sectional view of a second alternate embodiment of this invention.

Now referring to FIG. 9, a dual output embodiment is illustrated. It involves a body 200 with a single exhaust inlet 201 at one end and a pair of outlets 202 and 203 to the atmosphere. The exhaust inlet 201 is in the form of a porous pipe 204 with ports within the body 200 in a cylindrical diffusion chamber 205 with a number of ports 206 in its curved side wall 210 as well as a pair of ports 211 and 212 defined by the end openings of a pair of longitudinal pipes 213 and 214. The pipes 213 and 214 provide a straight exhaust gas flow path to a pair of matched venturi sections 215 and 216 which communicate with the outlet ports 202 and 203, respectively through respective porous pipes 220 and 221.

The diffusion chamber 205 allows the major proportion of the exhaust gases from the inlet 201 to exit into a larger chamber 222 surrounding the diffusion chamber 205 on three sides and enclosing the straight pipes 213 and 214. Exhaust gases in the larger chamber 222 exit via a pair of converging exits 223 and 224, each of which contain vanes 225 and 226 for imparting a swirling movement to the exhaust gases before reaching the venturi sections 215 and 216 in each branch.

Surrounding all of the above described portions of the muffler except the ends of the muffler 200 with their inlet and outlet ports is an annular chamber 230 having inlets 231 for admitting ambient air at the input end of the muffler having the exhaust inlet 201. Ambient air entering the ports 231 fills chamber 230 and flows through ports 232 into annular chambers 233 and 234 which surround the venturi sections 215 and 216. The ambient air next enters the downstream portion of the venturis 215 and 216 via respective ports 235 and 236 in the walls defining the venturis. Additional chambers 240 and 241 surround respective tailpipes 220 and 221. These chambers 240 and 241 are filled with sound absorbing material such as alumina fibers and communicate with the interior of the tail pipes via ports 242 and 243, respectively.

The ambient air, similarly to the other embodiments of this invention is thus mixed with the swirled exhaust gases.

The embodiment of FIG. 9 provides the same advantages as the other embodiments and additionally provides a lower frequency output sound. Further, since the ambient air is introduced into annular chamber 230 at the outermost wall of the muffler, it maintains the muffler external surface cooler to the touch.

The overall effect of this invention, regardless of the embodiment, is to improve exhaust flow and to decrease the back pressure on the engine. Exhaust gases are diffused into a larger volume of ambient air in the region of the muffler outlet. The dual layered multiport main pipe design and the use of the alumina fiber absorber greatly reduces the noise level. The vanes introduce a swirling path to the exhaust gases before mixing with ambient air. The downstream venturi reduces the pressure in the output region and reduces flow velocity in the tail pipe region, in part, due to the larger exit area.

Because of the cooling effect resulting from the use of auxiliary intake pipes, the muffler life is extended and the level of carbon monoxide produced is reduced.

The foregoing embodiments are merely illustrative of this invention and are not to be considered as limiting. It is easily recognized that one skilled in the art might deviate from the specific embodiments disclosed without departing from the spirit and scope of the invention.

Therefor this invention shall be gauged by the following claims interpreted in the light of the foregoing specification and drawing and including the protection afforded by the doctrine of equivalents.

What is claimed is:

1. A muffler for processing exhaust gases and releasing said gases comprising:
   a hollow body defining a chamber with an inlet and with an inlet port for receiving exhaust gases at one end thereof and an outlet end with an exhaust port for releasing the exhaust gases;
   means coupled to said inlet for diffusing exhaust gases into said chamber including a first pipe having a porous section with the porous section within said chamber;
   means including a series of helically arranged vanes for swirling said diffused exhaust gases in said chamber;
   a second pipe having an inlet end open to the atmosphere at the inlet end of said hollow body and having an open discharge end adjacent said vanes for mixing the swirled exhaust gases with ambient air;
   venturi means coupled to receive the mixed ambient air and swirled exhaust gases and for introducing the mixed ambient air and swirled exhaust gasses to said outlet end; and
   means including said exhaust port for discharging the swirled exhaust gases and mixed ambient air to the atmosphere.

2. A muffler in accordance with claim 1 wherein said body includes an exterior wall and at least a portion of an inner side of the wall defining the chamber includes a porous inner wall spaced from said exterior wall and an acoustic energy absorber in the space between said walls.

3. A muffler in accordance with claim 2 wherein said diffusing means comprises an additional porous pipe surrounding the porous section of said first pipe.

4. A muffler in accordance with claim 1 wherein said second pipe supports said vanes.

5. A muffler comprising:
   a body defining a chamber having an inlet side and an exhaust inlet to the inlet side of said chamber adapted to be coupled to an internal combustion engine;
   said inlet terminating in said chamber in a porous pipe;
   means defining at least one constricted outlet opening from said chamber for exhaust gases;
   means in said constricted outlet opening including a plurality of helical vanes for imparting helical flow to exhaust gases exiting said chamber;
   means including at least one opening in the inlet side of said muffler body for introducing ambient air into said constricted opening adjacent the helical flow exhaust gas flow for mixing with the exhaust gases;
   means defining a tailpipe section for exhausting exhaust gases; and
   venturi means communicating with said constricted outlet opening and said tailpipe section defining means.

6. A muffler in accordance with claim 5 wherein said porous pipe is enclosed within a second porous pipe to define a diffusion chamber within said chamber of said muffler body.

7. A muffler in accordance with claim 5 wherein said means for introducing ambient air into said constricted opening comprises at least one pipe extending from the inlet side of said muffler body through said constricted opening.

8. A muffler in accordance with claim 7 wherein said means defining said constricted opening and said pipe confine a plurality of helical paths therebetween.

9. A muffler in accordance with claim 5 wherein said venturi means comprises a double walled tailpipe section defining a space and including means for introducing ambient air into said space and means for passing ambient air from said space to the outlet of said tailpipe section.

10. A muffler in accordance with claim 5 wherein said body includes a lining of sound absorbing material and porous wall means retaining said sound absorbing means in place.

11. A muffler in accordance with claim 7 including a pair of pipes oppositely disposed with respect to said inlet porous pipe.

12. A muffler in accordance with claim 5 including means for conveying a portion of the exhaust gases directly past said helical flow imparting means.

13. A muffler in accordance with claim 5 wherein said venturi means includes a constricting input section, a central constricted section and an expanding discharge section; and
   including means for introducing ambient air into the expanding discharge section of said venturi means.

14. A muffler in accordance with claim 13 wherein said venturi means comprises a double walled extension of said tailpipe section defining a space and ambient air is introduced into the space between the walls of said double walled section for discharge through ports in said expanding discharge section of said venturi means.

15. A muffler comprising:
   a body defining a chamber having an inlet side and an exhaust inlet to the inlet side of said chamber adapted to be coupled to an internal combustion engine;
   means defining an outlet opening from said chamber;
   said inlet terminating in said chamber in a pipe having a porous section for diffusing exhaust gases into said chamber, said exhaust inlet, said chamber and said outlet opening means constituting a flow path for said exhaust gasses;
   means including a plurality of helical vanes in one of said chamber and said outlet opening means for imparting helical flow to exhaust gases in said flow path;
   a body of sound absorbing material in said chamber and porous wall means retaining said sound absorbing material in place;
   venturi means in said flow path between said helical vanes and said outlet opening means; and
   means including at least one opening in the inlet side of said muffler body for introducing ambient air into said helical exhaust gas flow downstream of one of said venturi and said outlet opening means for mixing with the exhaust gases.

16. A muffler in accordance with claim 15 wherein said ambient air is mixed in said muffler body with exhaust gases in said exhaust gas flow path downstream of said venturi means.

17. A muffler in accordance with claim 15 including means for diverting a portion of the exhaust gases past said helical vanes.

18. A muffler in accordance with claim 17 wherein said diverting means comprises a longitudinally extending pipe.

19. A muffler in accordance with claim 18 wherein said helical vanes encircle said longitudinally extending pipe.

20. A muffler in accordance with claim 19 wherein said muffler includes dual sets of longitudinal pipes, vanes, venturi means and tailpipes, each in communication with the exhaust inlet and the said means for introducing ambient air into the muffler.

* * * * *

UNITED STATES PATENT AND TRADEMARK OFFICE
CERTIFICATE OF CORRECTION

PATENT NO. : 5,058,704
DATED      : October 22, 1991
INVENTOR(S): Chuen-Huan Yu

It is certified that error appears in the above-identified patent and that said Letters Patent is hereby corrected as shown below:

Column 3, line 27, after "second", insert --convergence--.

Column 8, following Claim 20, add the following claims:

Claim 21. A muffler in accordance with Claim 15 including a pair of pipes oppositely disposed with respect to said inlet porous pipe.

Claim 22. A muffler in accordance with Claim 15 including means for conveying a portion of the exhaust gases directly past said helical flow imparting means.

Claim 23. A muffler in accordance with Claim 15 including means for diverting a portion of the exhaust gases past said means for imparting helical flow to the exhaust gases.

Signed and Sealed this

Twenty-third Day of March, 1993

Attest:

STEPHEN G. KUNIN

*Attesting Officer*     *Acting Commissioner of Patents and Trademarks*